US012746727B2

(12) United States Patent
Agrawal et al.

(10) Patent No.: US 12,746,727 B2
(45) Date of Patent: Sep. 29, 2026

(54) AI ENABLED 3D PRINTING FOR CONTROLLED MICROSTRUCTURE THROUGH INSULATION INTEGRATION

(71) Applicant: INTERNATIONAL BUSINESS MACHINES CORPORATION, Armonk, NY (US)

(72) Inventors: Tushar Agrawal, West Fargo, ND (US); Sarbajit Kumar Rakshit, Kolkata (IN); Carolina Garcia Delgado, Zapopan (MX); Martin G. Keen, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 257 days.

(21) Appl. No.: 18/784,996

(22) Filed: Jul. 26, 2024

(65) Prior Publication Data

US 2026/0027780 A1 Jan. 29, 2026

(51) Int. Cl.
*B29C 64/393* (2017.01)
*B29C 64/188* (2017.01)
(Continued)

(52) U.S. Cl.
CPC .......... *B29C 64/393* (2017.08); *B29C 64/188* (2017.08); *B29C 64/336* (2017.08); (Continued)

(58) Field of Classification Search
CPC ... B29C 64/188; B29C 64/336; B29C 64/393; B33Y 10/00; B33Y 40/20; B33Y 50/02
See application file for complete search history.

(56) References Cited

U.S. PATENT DOCUMENTS

| | | | |
|---|---|---|---|
| 10,558,200 | B2 | 2/2020 | De Pena et al. |
| 10,730,282 | B2 | 8/2020 | De Pena et al. |

(Continued)

FOREIGN PATENT DOCUMENTS

| | | | |
|---|---|---|---|
| CN | 104103385 | A | 10/2014 |
| CN | 116766579 | A | 9/2023 |
| TW | I437875 | B | 5/2014 |

OTHER PUBLICATIONS

IPCOM000266641d, entitled "Method and System for 3D Printing with Dynamic Insulation for Controlled Solidification", published Aug. 4, 2021, 4 pages. (Year: 2021).*

(Continued)

*Primary Examiner* — Ryan M Stiglic
(74) *Attorney, Agent, or Firm* — Robert R. Aragona

(57) ABSTRACT

An embodiment for AI enabled 3D printing for a controlled microstructure through insulation integration is provided. The embodiment may include receiving real-time and historical data from one or more sources in a 3D printing environment. The embodiment may also include identifying a temperature and a cooling rate of a first material of a 3D printed object printed by a first 3D printing nozzle. The embodiment may further include identifying one or more required properties of one or more microstructures. The embodiment may also include computing a required cooling rate of the first material. The embodiment may further include predicting a time at which to apply a second material onto the first material. The embodiment may also include computing one or more specifications of the second material. The embodiment may further include causing a 3D printing nozzle to print the second material onto the first material.

20 Claims, 4 Drawing Sheets

(51) Int. Cl.

| | |
|---|---|
| ***B29C 64/336*** | (2017.01) |
| ***B33Y 10/00*** | (2015.01) |
| ***B33Y 40/20*** | (2020.01) |
| ***B33Y 50/02*** | (2015.01) |

(52) U.S. Cl.

CPC ............... *B33Y 50/02* (2014.12); *B33Y 10/00* (2014.12); *B33Y 40/20* (2020.01)

(56) References Cited

U.S. PATENT DOCUMENTS

| | | | |
|---|---|---|---|
| 11,103,927 | B2 | 8/2021 | Tang et al. |
| 11,738,507 | B2 | 8/2023 | Barnes |
| 11,780,170 | B2 | 10/2023 | Barnes et al. |
| 11,806,928 | B2 | 11/2023 | Cropper et al. |
| 11,897,204 | B2 | 2/2024 | Fornos et al. |
| 11,919,225 | B2 | 3/2024 | Ding et al. |
| 12,409,512 | B2 * | 9/2025 | Jacquemetton ....... B22F 10/368 |
| 2011/0285052 | A1 | 11/2011 | Wigand et al. |
| 2018/0311769 | A1 * | 11/2018 | TenHOUTEN ......... B22F 10/28 |
| 2019/0270247 | A1 * | 9/2019 | Hyatt .................... B29C 64/295 |
| 2021/0114293 | A1 | 4/2021 | Kim et al. |
| 2021/0178670 | A1 * | 6/2021 | Denbeaux ............. B29C 64/165 |
| 2022/0008997 | A1 | 1/2022 | Goldammer et al. |
| 2022/0080671 | A1 | 3/2022 | Glassman |
| 2022/0088879 | A1 | 3/2022 | Kothari et al. |
| 2023/0191704 | A1 | 6/2023 | Font Calafell et al. |

OTHER PUBLICATIONS

"How do you monitor and control the temperature, humidity, and ventilation of your 3D printing workspace?" 3D Printing, retrieved from web dated May 8, 2024, 8 pages.

"Precise Thermal Management for Additive Manufacturing", Laird-Thermal Systems, retrieved from web dated May 8, 2024, 11 pages.

"What is Heat Treatment", https://www.secowarwick.com/en/tech-spotlights/faq/what-is-heat-treatment/, retrieved from web dated May 8, 2024, 3 pages.

Globenewswire, "With 24.3% CAGR, 3D Printing Market Size Worth USD 83.90 Billion in 2029", Fortune Business Insights, Apr. 19, 2022, 9 pages, https://www.globenewswire.com/en/news-release/2022/04/19/2424496/0/en/With-24-3-CAGR-3D-Printing-Market-Size-Worth-USD-83-90-Billion-in-2029.html.

IBM Lighthouse, "Shifting transport paradigms: Understanding the implications of 3D printing on the global transportation industry", Modified Jun. 11, 2015, 4 pages, https://w3.ibm.com/services/lighthouse/documents/39220.

IBM, "What is industry 4", accessed on May 30, 2024, 13 pages, https://www.ibm.com/topics/industry-4-0.

IPCOM000245303d, entitled "Method and System for Controlling of Products During 3-Dimensional (3D) Printing", published Feb. 26, 2016 <Retrieved Tuesday, May 7, 2024 at 6:42 PM.

MarketsAndMarkets, "3D Printing Market Size, Share & Industry Growth Analysis by Offering (Printer, Material, Software, Services), Technology (Fused Deposition Modelling, Stereolithography), Process (Powder Bed Fusion, Material Extrusion, Binder Jetting), Application, Vertical & Region—Global Forecast to 2029", Report, accessed on Jun. 3, 2024, 16 pages, https://www.marketsandmarkets.com/Market-Reports/3d-printing-market-1276.html.

Peterson et al., "Shifting transport paradigms", IBM, Sep. 2014, 16 pages, https://www.ibm.com/thought-leadership/institute-business-value/report/3d-printing.

Stumpfe, "Digital platform for industrial 3D printing", IBM Blog, Apr. 4, 2019, 12 pages, https://www.ibm.com/blogs/blockchain/2019/04/digital-platform-for-industrial-3d-printing/.

* cited by examiner

AI ENABLED 3D PRINTING FOR CONTROLLED MICROSTRUCTURE THROUGH INSULATION INTEGRATION

BACKGROUND

The present invention relates generally to the field of computing, and more particularly to a system for AI enabled 3D printing for a controlled microstructure through insulation integration.

Heat treatment is a controlled process used to alter the physical and sometimes chemical properties of a material, typically a metal or alloy, through the application of heat. The main objectives of heat treatment may be to improve mechanical properties of a material, such as hardness, ductility, and strength, and to relieve internal stresses. Additionally, controlled cooling of the material may be an important feature of the 3D printing process.

SUMMARY

According to one embodiment, a method, computer system, and computer program product for AI enabled 3D printing for a controlled microstructure through insulation integration is provided. The method, computer system, and computer program product may include receiving real-time and historical data from one or more sources in a 3D printing environment. The method, computer system, and computer program product may also include identifying a temperature and a cooling rate of a first material of a 3D printed object printed by a first 3D printing nozzle based on the real-time and the historical data. The method, computer system, and computer program product may further include identifying one or more required properties of one or more microstructures of the 3D printed object based on an application of the 3D printed object. The method, computer system, and computer program product may also include computing a required cooling rate of the first material to achieve the required one or more properties. The method, computer system, and computer program product may further include predicting a time at which to apply a second material onto the first material using a second 3D printing nozzle based on the identified temperature and the required cooling rate. The method, computer system, and computer program product may also include computing one or more specifications of the second material based on the identified temperature and the required cooling rate. The method, computer system, and computer program product may further include causing the second 3D printing nozzle to print the second material onto the first material at the predicted time in accordance with the computed one or more specifications.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
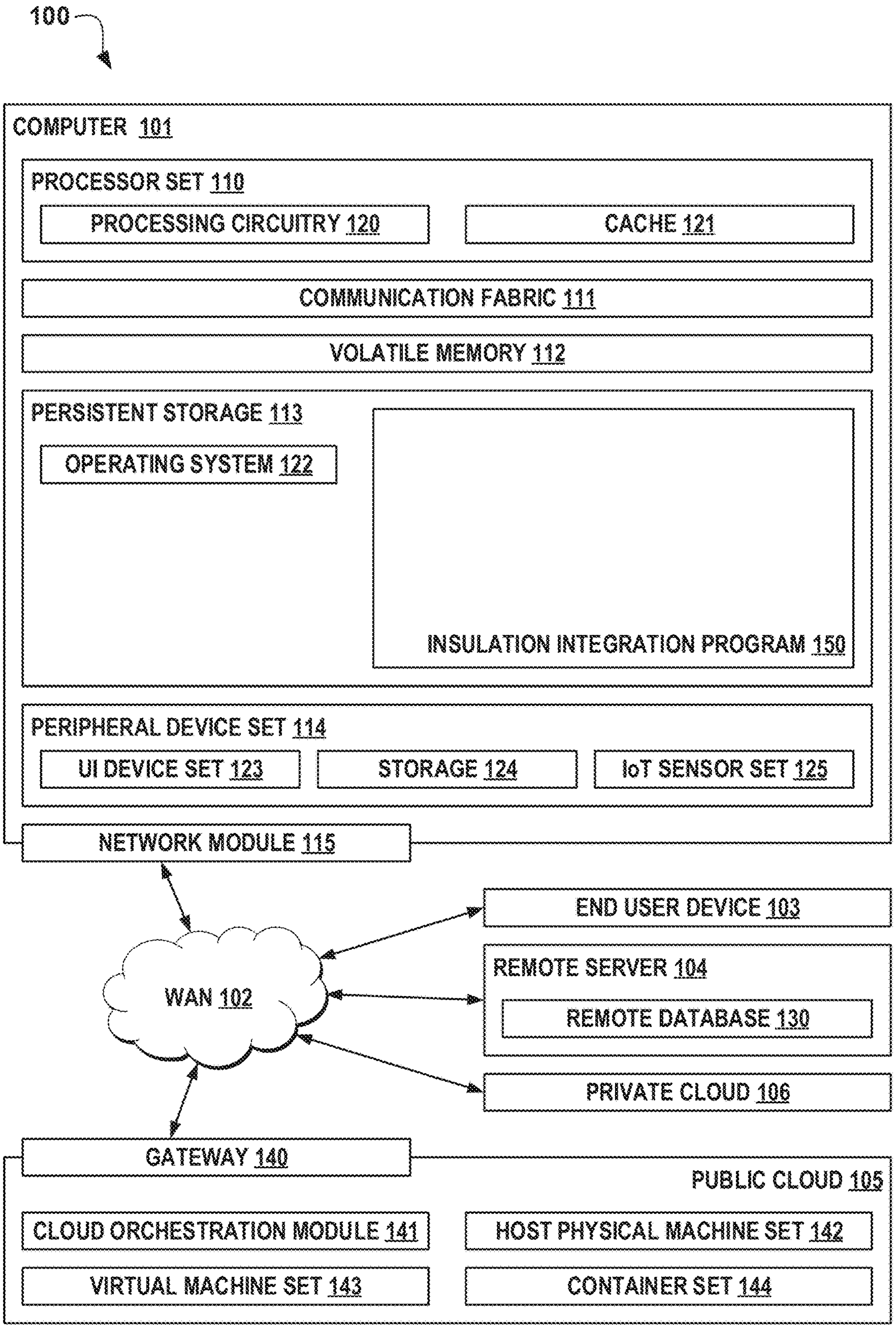
FIG. 1 illustrates an exemplary computing environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to a system for AI enabled 3D printing for a controlled microstructure through insulation integration. The following described exemplary embodiments provide a system, method, and program product to, among other things, compute a required cooling rate of a first material to achieve one or more required properties of one or more microstructures of a 3D printed object and, accordingly, cause a 3D printing nozzle to print a second material onto the first material at a predicted time in accordance with computed one or more specifications. Therefore, the present embodiment has the capacity to improve 3D printing technology by ensuring optimal microstructure formation during a 3D printing process.

As previously described, heat treatment is a controlled process used to alter the physical and sometimes chemical properties of a material, typically a metal or alloy, through the application of heat. The main objectives of heat treatment may be to improve mechanical properties of a material, such as hardness, ductility, and strength, and to relieve internal stresses. Additionally, controlled cooling of the material may be an important feature of the 3D printing process. During the 3D printing process, rapid cooling can lead to the formation of residual stresses and defects (e.g., porosity) in the 3D printed object. This problem is typically addressed by performing a separate process for heat treatment. However, performing a separate process takes more time, which may result in additional defects due to rapid cooling.

It may therefore be imperative to have a system in place to apply an insulation material while the 3D printing process is being performed. Thus, embodiments of the present invention may provide advantages including, but not limited to, ensuring optimal microstructure formation during a 3D printing process, applying an insulation material while the 3D printing process is being performed, and enhancing coordination between first and second 3D printing nozzles. The present invention does not require that all advantages need to be incorporated into every embodiment of the invention.

According to at least one embodiment, when 3D printing an object, real-time and historical data from one or more sources in a 3D printing environment may be received in order to identify a temperature and a cooling rate of a first material of a 3D printed object printed by a first 3D printing nozzle based on the real-time and the historical data. Upon identifying the temperature and the cooling rate, one or more required properties of one or more microstructures of the 3D printed object may be identified based on an application of the 3D printed object so that a required cooling rate of the first material to achieve the required one or more properties may be computed. Then, a time at which to apply a second material onto the first material using a second 3D printing nozzle may be predicted based on based on the identified temperature and the required cooling rate such that one or more specifications of the second material may be computed based on the identified temperature and the required cooling rate. Upon computing the one or more specifications, the second 3D printing nozzle may be caused to print the second material onto the first material at the predicted time in accordance with the computed one or more specifications in order to determine whether the second material is achieving the required cooling rate. According to at least one embodiment, based on determining the second material is achieving the required cooling rate, the second material may continue to be printed onto the first material at the predicted time in accordance with the computed one or more specifications.

According to at least one other embodiment, based on determining the second material is not achieving the required cooling rate, an iterative process may be performed, until the second material is determined to be achieving the required cooling rate, where one or more updated specifications of the second material may be computed based on feedback from a thermal model simulation that simulates the cooling rate of the first material with the second material applied such that the second 3D printing nozzle may be caused to print the second material onto the first material in accordance with the computed one or more updated specifications. In either embodiment, the second material may be removed from the first material once cooling is complete.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), crasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following described exemplary embodiments provide a system, method, and program product to compute a required cooling rate of a first material to achieve one or more required properties of one or more microstructures of a 3D printed object and, accordingly, cause a 3D printing nozzle to print a second material onto the first material at a predicted time in accordance with computed one or more specifications.

Referring to FIG. 1, an exemplary computing environment 100 is depicted, according to at least one embodiment. Computing environment 100 contains an example of an environment for the execution of at least some of the computer code involved in performing the inventive methods, such as an insulation integration program 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory 112 may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage 113 allows writing of data, deletion of data and re-writing of data. Some familiar forms of persistent storage 113 include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

Peripheral device set 114 includes the set of peripheral devices of computer 101. Data communication connections between the peripheral devices 114 and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database), this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector. Peripheral device set 114 may also include a 3D printer, thermal cameras, thermocouples, and/or infrared sensors.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN 102 and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments the private cloud 106 may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the insulation integration program 150 may be a program capable of receiving real-time and historical data from one or more sources in a 3D printing environment, computing a required cooling rate of a first material to achieve one or more required properties of one or more microstructures of a 3D printed object, causing a 3D printing nozzle to print a second material onto the first material at a predicted time in accordance with computed one or more specifications, ensuring optimal microstructure formation during a 3D printing process, applying an insulation material while the 3D printing process is being performed, and enhancing coordination between first and second 3D printing nozzles. Furthermore, notwithstanding depiction in computer 101, the insulation integration program 150 may be stored in and/or executed by, individually or in any combination, end user device 103, remote server 104, public cloud 105, and private cloud 106. The insulation integration method is explained in further detail below with respect to FIGS. 2A and 2B. It may be appreciated that the examples described below are not intended to be limiting, and that in embodiments of the present invention the parameters used in the examples may be different.

Figure 2A:
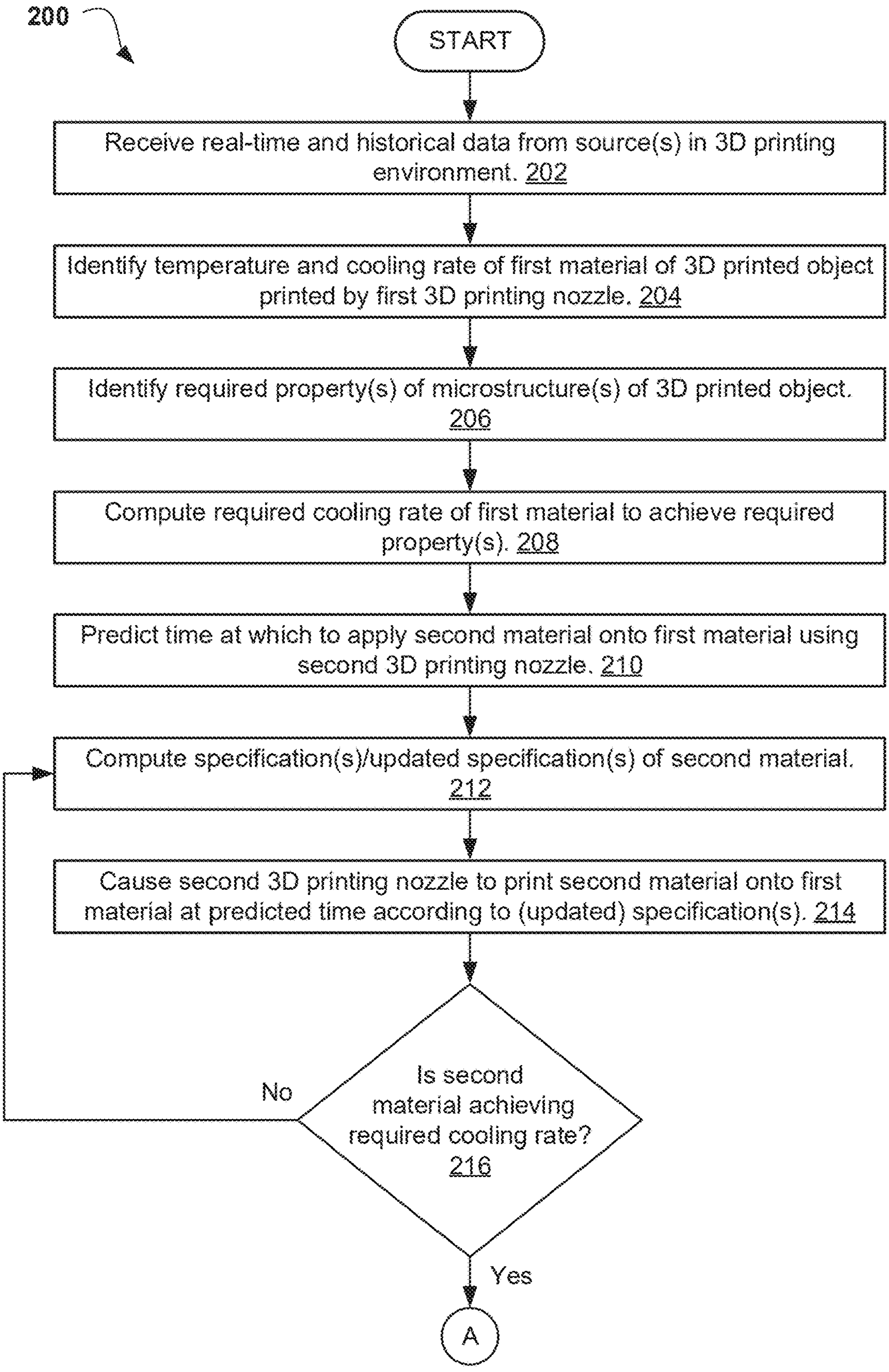
FIGS. 2A and 2B illustrate an operational flowchart for AI enabled 3D printing for a controlled microstructure through insulation integration in a 3D printing insulation integration process according to at least one embodiment.
Figure 2B:
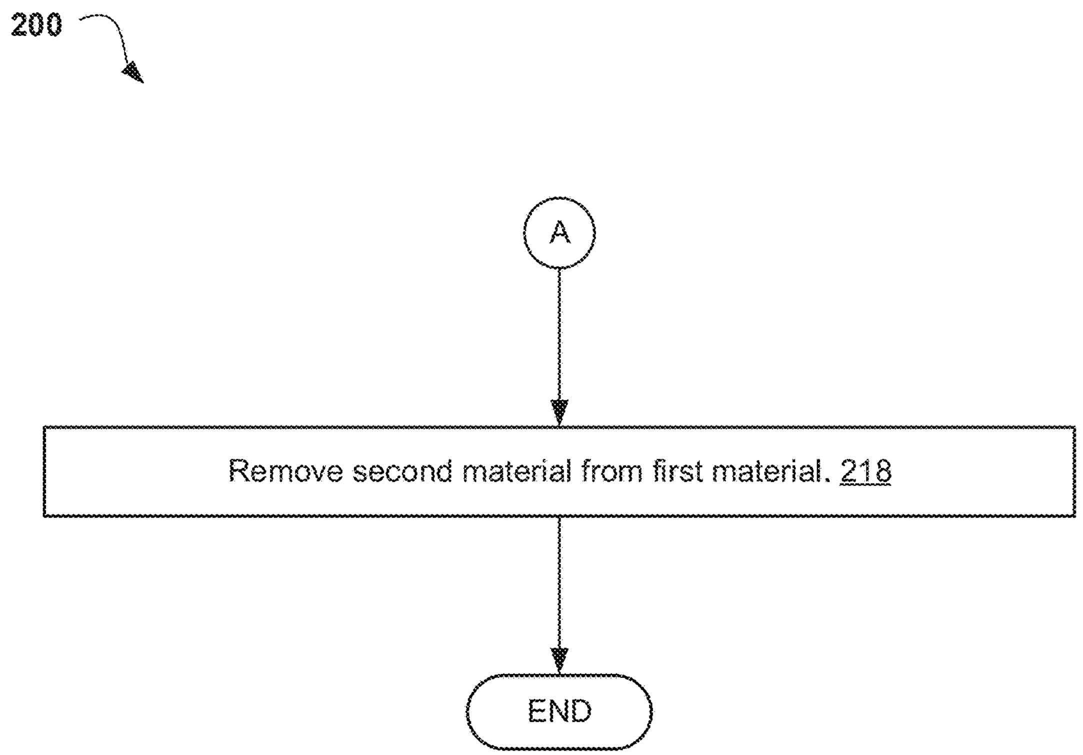
Figure 3:
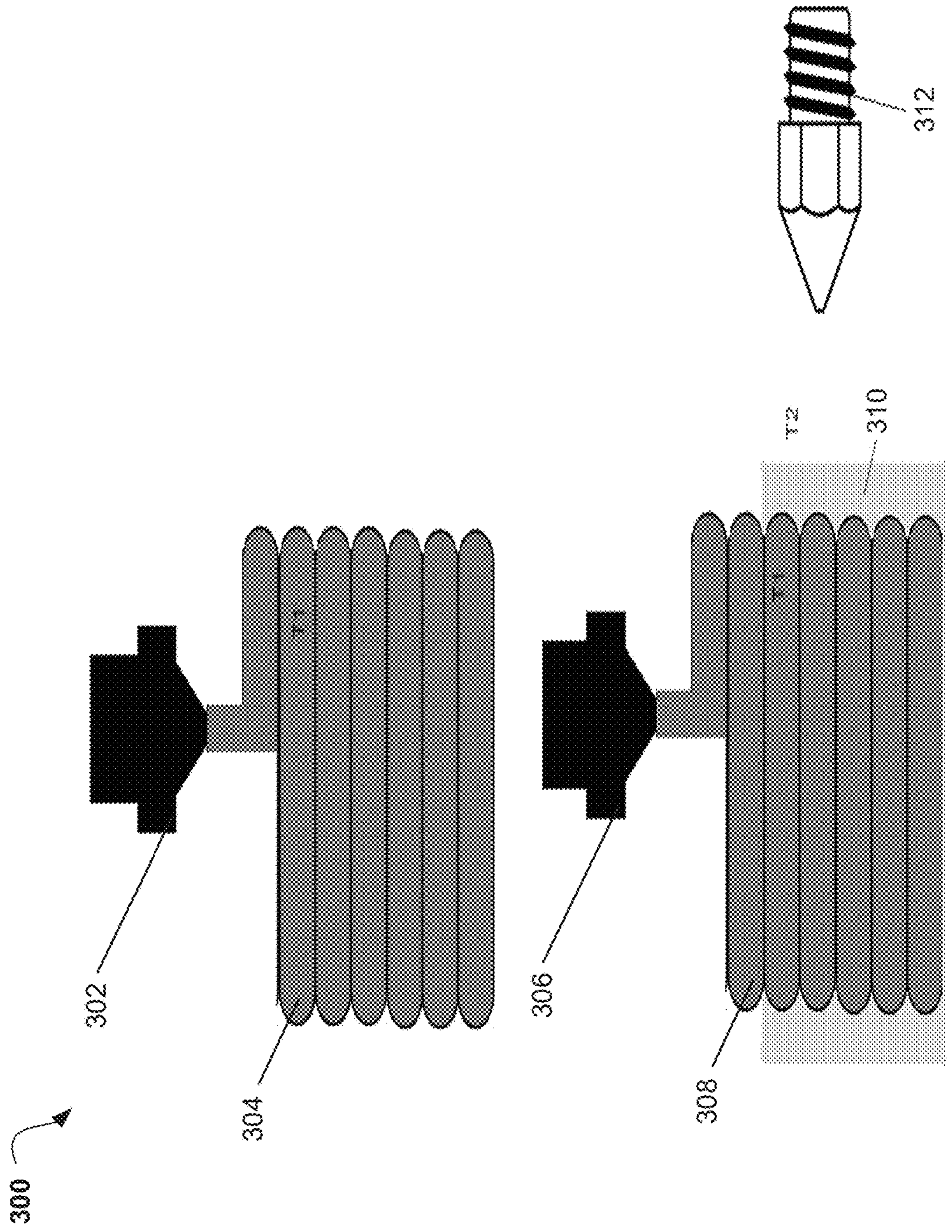
FIG. 3 is an exemplary diagram depicting a first material being 3D printed before insulation integration and after insulation integration according to at least one embodiment.

Referring now to FIGS. 2A and 2B, an operational flowchart for AI enabled 3D printing for a controlled microstructure through insulation integration in a 3D printing insulation integration process 200 is depicted according to at least one embodiment. At 202, the insulation integration program 150 receives the real-time and the historical data from the one or more sources in the 3D printing environment. The real-time data may include, but is not limited to, the temperature of the first material as it is printed by the first 3D printing nozzle, as illustrated in FIG. 3. For example, the temperature of the first material may be 100° F. The one or more sources may include, but are not limited to, thermal cameras, thermocouples, and/or infrared sensors. It may be appreciated that in embodiments of the present invention, "first material" means the material used to form the 3D printed object, and "second material" means the material used to insulate the first material.

The historical data may include, but is not limited to, materials being used, material properties, printing parameters (e.g., temperature, speed, and layer height), dimensions of the 3D printed object, and/or cooling rate for different types of materials. The material properties may be received for the first material of the 3D printed object printed by the first 3D printing nozzle and second material printed by the second 3D printing nozzle. For example, the material properties may include thermal conductivity, specific heat, and density. The historical data may be input into and retrieved from a knowledge corpus, such as remote database 130. In this manner, the insulation integration program 150 may learn from the historical data.

Then, at 204, the insulation integration program 150 identifies the temperature and the cooling rate of the first material of the 3D printed object printed by the first 3D printing nozzle. The temperature and the cooling rate are identified based on the real-time and the historical data. For example, as described above, a thermocouple in the 3D printing environment may indicate that the temperature of the first material is 100° F. The cooling rate of the first material may be identified based on the historical data regarding the cooling rate for different types of materials. For example, the cooling rate of a metal may be 1° per minute, whereas the cooling rate of a plastic may be 0.5° per minute. Additionally, the cooling rate may be calculated using one or more algorithms.

According to at least one embodiment, the cooling rate may be calculated using Fourier's Law of Heat Conduction, represented by Q=−k*A*(dT/dx), where Q is the heat transfer rate (W or J/s), k is the thermal conductivity of the material (W/m k), A is the Cross-sectional area perpendicular to heat flow (m^2), and dT/dx is the temperature gradient (K/m).

According to at least one other embodiment, the cooling rate may be calculated using Newton's Law of Cooling, represented by Q=h*A*ΔT, where Q is the heat transfer rate (W or J/s), h is the convective heat transfer coefficient (W/m^2 K), A is the surface area (m^2), and ΔT is the temperature difference between the object's surface and a fluid (K).

According to at least one further embodiment, the cooling rate may be calculated using Steady-State Heat Conduction through a Material, represented by Q=(k*A*ΔT)/L, where Q is the heat transfer rate (W or J/s), k is the thermal conductivity of the material (W/m k), A is the Cross-sectional area perpendicular to heat flow (m^2), ΔT is the temperature difference across the material (K), and L is the thickness of the material (m).

According to at least one other embodiment, the cooling rate may be calculated using Heat Transfer by Radiation, represented by Q=ε*σ*A*(T1^4−T2^4), where Q is the heat transfer rate (W or J/s), ε is the emissivity of the surface (unitless), σ is the Stefan-Boltzmann Constant (5.67*10^(−8) W/m^2 K^4), A is the surface area (m^2), T1 is the temperature of the radiating surface (K), and T2 is the temperature of the receiving surface (K).

Next, at 206, the insulation integration program 150 identifies the one or more required properties of the one or more microstructures of the 3D printed object. The one or more required properties are identified based on the application of the 3D printed object. Examples of the required properties may include, but are not limited to, layer adhesion, layer height, porosity, and/or strength. The insulation integration program 150 may annotate the historical data collected above with respect to step 202 with information about the resulting microstructure, such as details on layer adhesion, layer height, porosity, and/or strength. A machine learning model, such as a neural network, may be trained to predict microstructure outcomes based on the annotated historical data. Additionally, the real-time data relating to the temperature of the first material may be fed to the machine learning model. For example, where the outcome results in a defect in the microstructure, the annotated values may not be identified as the one or more required properties. However, assuming the resulting microstructure performed well in the machine learning model, these annotated values may represent the one or more required properties.

For example, where the application of the 3D printed object is for use during construction, the required strength may be greater than where the application of the 3D printed object is for use in athletic equipment. In another example, where the application of the 3D printed object is for use in a prosthetic device, the required porosity may be less than where the application of the 3D printed object is for use in the water when the 3D printed object is designed to sink to the bottom. In a further example, where the application of the 3D printed object is for use in hanging other objects, the required layer adhesion may be greater than where the application of the 3D printed object is for use in dentures.

Then, at 208, the insulation integration program 150 computes the required cooling rate of the first material to achieve the required one or more properties. As used herein, the "required cooling rate" means the cooling rate to achieve the required one or more properties without any defects in the 3D printed object. The required cooling rate may be computed using any of the formulas described above with respect to step 204. The required cooling rate may be dependent upon the particular material being used as the first material. For example, titanium may have a different required cooling rate than aluminum.

According to at least one embodiment, the insulation integration program 150 may use thermal simulation software (e.g., finite element analysis) to model the required cooling rate. The simulation may consider factors such as the heat generated by the first 3D printing nozzle in printing the first material and the cooling mechanisms in place. The trained machine learning model, described above with respect to step 206, may then be used to compute the required cooling rate based on the thermal model predictions.

For example, where the required strength of the 3D printed object is enough strength to handle a 100 pound load, the trained machine learning model may predict the required cooling rate of the first material to handle the 100 pound load. Continuing the example, where one simulated cooling rate results in the first material not being able to handle the 100 pound load, that simulated cooling rate may not be sufficient. However, where another simulated cooling rate results in the first material being able to handle the 100 pound load, that other simulated cooling rate may be the required cooling rate. In another example, where the required porosity of the 3D printed object is 0 (e.g., meaning the 3D printed object should not fill with water), the trained machine learning model may predict the required cooling rate for the first material to have no porosity. Continuing the example, where one simulated cooling rate results in the first material filling up with water, that simulated cooling rate may not be sufficient. However, where another simulated cooling rate results in the first material being water resistant, that other simulated cooling rate may be the required cooling rate. In a further example, where the required layer adhesion of the 3D printed object is enough adhesion to mount a 5 pound picture on a wall, the trained machine learning model may predict the required cooling rate of the first material to mount the 5 pound picture. Continuing the example, where one simulated cooling rate results in the 5 pound picture falling, that simulated cooling rate may not be sufficient. However, where another simulated cooling rate results in the first material being able to hang the 5 pound picture without falling, that other simulated cooling rate may be the required cooling rate.

Next, at 210, the insulation integration program 150 predicts the time at which to apply the second material onto the first material using the second 3D printing nozzle. The time at which to apply the second material is predicted based on the identified temperature and the required cooling rate.

It may be appreciated that in embodiments of the present invention, the first 3D printing nozzle prints the first material and the second 3D printing nozzle prints the second material. The second material may be comprised of an insulation material that provides insulation to control the cooling of the first material.

The insulation integration program 150 may continuously monitor the temperature of the first material such that the temperature may be correlated with the required cooling rate. For example, where the temperature of the first material is below a pre-determined threshold for which controlled cooling would be required, the second material may not be applied to the first material. In another example, where the temperature of the first material is at or above the pre-determined threshold for which controlled cooling would be required, the second material may be applied to the first material at the time when the temperature reached the pre-determined threshold. Continuing the example, the pre-determined threshold temperature may be 150° F.

According to at least one embodiment, the time at which to apply the second material may be a duration in which to apply the second material. For example, based on the required cooling rate, the second material may be applied to the first material for a duration of 30 minutes. The duration in which to apply the second material may be directly proportional to the temperature, where a higher temperature results in a longer duration.

Then, at 212, the insulation integration program 150 computes the one or more specifications of the second material. The one or more specifications are computed based on the identified temperature and the cooling rate. The computed one or more specifications may include, but are not limited to, a thickness of the second material and/or a type of the second material. The thickness of the second material may be inversely proportional to the required cooling rate, where a thicker second material provides better insulation but slows down the cooling rate.

According to at least one embodiment, computing the one or more specifications of the second material may include identifying one or more defect zones in the first material and computing at least one specification of the one or more specifications of the second material for the one or more defect zones. As used herein, "defect zones" means one or more portions of the second material that based on the historical data are prone to warping, cracking, and/or other structural defects. The at least one specification may be a thickness for each zone of the one or more defect zones. For example, where there are four defect zones in the 3D printed object, a different the thickness may be computed for each of the four defect zones. In another example, where there are four defect zones in the 3D printed object, a first thickness of the second material may be computed for a first two defect zones, and a second thickness of the second material may be computed for a second two defect zones.

According to at least one other embodiment, the trained machine learning model (e.g., the neural network) may be used to predict the one or more specifications of the second material that work best (e.g., the one or more specifications that result in a microstructure with the fewest structural defects). For example, based on the historical data, the trained machine learning model may predict that the second material should be titanium having a thickness of 12 inches.

Next, at 214, the insulation integration program 150 causes the second 3D printing nozzle to print the second material onto the first material at the predicted time. The second 3D printing nozzle prints the second material in accordance with the one or more specifications. The insulation integration program 150 may send a signal to the second 3D printing nozzle, which may cause the second 3D printing nozzle to start printing the second material onto the first material. The first 3D printing nozzle and the second 3D printing nozzle may print the first material and the second material, respectively, simultaneously.

According to at least one embodiment, the second 3D printing nozzle may spray the second material onto the first material. According to at least one other embodiment, the second 3D printing nozzle may apply the second material onto the first material layer-by-layer. For example, where the duration in which to apply the second material is 30 minutes, the second 3D printing nozzle may spray or apply the second material onto the first material for the 30 minute duration. In either embodiment, the second 3D printing nozzle may print the second material onto the first material consistent with the computed one or more specifications for each defect zone in the first material. For example, where there are four defect zones in the 3D printed object, and the thickness for defect zone 1 is 12 inches, the thickness for zone 2 is 8 inches, the thickness for zone 3 is 6 inches, and the thickness for zone 4 is also 8 inches, the second 3D printing nozzle may print an 12 inch thick second material onto the first material in zone 1, an 8 inch thick second material onto the first material in zone 2, a 6 inch thick second material onto the first material in zone 3, and an 8 inch thick second material onto the first material in zone 4.

Then, at 216, the insulation integration program 150 determines whether the second material is achieving the required cooling rate. The determination may be made based on the real-time data relating to the temperature of the first material. For example, where the required cooling rate of the first material is 1° per minute, and the second material is cooling the first material at a rate of 1° per minute, the determination may be made that the second material is achieving the required cooling rate. In another example, where the required cooling rate of the first material is 1° per minute and the second material is cooling the first material at a rate of 1.5° per minute, the determination may be made that the second material is not achieving the required cooling rate.

In response to determining the second material is achieving the required cooling rate (step 216, "Yes" branch), the 3D printing insulation integration process 200 proceeds to step 218 to remove the second material from the first material. In response to determining the second material is not achieving the required cooling rate (step 216, "No" branch), the 3D printing insulation integration process 200 reverts to step 212 to compute the one or more updated specifications of the second material.

It may be appreciated that in embodiments where the second material is not achieving the required cooling rate, steps 212 and 214 may be iterated until the second material is determined to be achieving the required cooling rate. One or more updated specifications of the second material may be computed based on feedback from a thermal model simulation that simulates the cooling rate of the first material with the second material applied. The insulation integration program 150 may use the material properties (e.g., thermal conductivity, specific heat, and/or density) of the first material and the second material as well as the thickness of the second material to create the thermal model that simulates the heat transfer within the 3D printed object with the second material applied. The model may vary the thickness until the required heat transfer is obtained. With each iteration, the thermal model may improve the accuracy of the computed one or more specifications by adjusting the thickness of the second material to achieve the required cooling rate.

For example, where the required cooling rate of the first material is 1° per minute and the second material having a thickness of 6 inches is cooling the first material at a rate of 1.5° per minute, the thermal model may update the thickness of the second material to be 8 inches, since a thicker second material may slow the cooling rate. Then, the second 3D printing nozzle may be caused to print the second material onto the first material in accordance with the computed one or more updated specifications. Continuing the example, where the thermal model updates the thickness of the second material to be 8 inches, the second 3D printing nozzle may print an 8 inch thick second material onto the first material.

In embodiments where the second material is achieving the required cooling rate, the second 3D printing nozzle may continue to print the second material onto the first material at the predicted time in accordance with the computed one or more specifications.

Next, at 218, the insulation integration program 150 removes the second material from the first material once cooling is complete.

According to at least one embodiment, the second material may be removed by a laser beam. For example, a laser beam may selectively remove one or more layers of the second material. According to at least one other embodiment, the second material may be removed by a robotic device applying mechanical force. For example, the robotic device may use mechanical force to peel off one or more layers of the second material. According to at least one further embodiment, the second material may be removed by a chemical cleaning system. For example, a chemical composition may be applied to the second material to etch one or more layers of the second material.

According to at least one other embodiment, removing the second material from the first material may include deploying the one or more robotic devices to remove the second material from one or more sections of the first material. For example, the one or more robotic devices may be deployed to the location of the second material and as the second material is removed, the one or more robotic devices may use suction to collect the removed second material. The one or more robotic devices may then be caused to apply the removed second material to one or more different sections of the first material. For example, the second material may be removed from zone 2 and applied to zone 3. In this manner, the removed second material may be efficiently recycled for used in different portions of the 3D printed object.

Referring now to FIG. 3, an exemplary diagram 300 depicting a first material being 3D printed before insulation integration and after insulation integration is shown according to at least one embodiment. In the diagram 300, the first 3D printing nozzle before insulation integration 302 may be actively printing the first material without insulation integration 304. The first material without insulation integration 304 may have a first temperature T1. During the active 3D printing, the first 3D printing nozzle after insulation integration 306 may be actively printing the first material with insulation integration 308. The first material with insulation integration 308 may also have the same first temperature T1. A second material 310 may be printed onto one or more sections of the first material with insulation integration 308. The second material may have a second temperature T2 that is different from the first temperature T1. The second material 310 may be applied layer-by-layer or otherwise sprayed onto the one or more sections of the first material with insulation integration 308 by the second 3D printing nozzle 312. The second 3D printing nozzle 312 may operate independently during the 3D printing process.

It may be appreciated that FIGS. 2A, 2B, and 3 provide only an illustration of one implementation and do not imply any limitations with regard to how different embodiments may be implemented. Many modifications to the depicted environments may be made based on design and implementation requirements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of AI enabled 3D printing for a controlled microstructure through insulation integration, the method comprising:
- receiving real-time and historical data from one or more sources in a 3D printing environment;
- identifying a temperature and a cooling rate of a first material of a 3D printed object printed by a first 3D printing nozzle based on the real-time and the historical data;
- identifying one or more required properties of one or more microstructures of the 3D printed object based on an application of the 3D printed object;
- computing a required cooling rate of the first material to achieve the required one or more properties;
- predicting a time at which to apply a second material onto the first material using a second 3D printing nozzle based on the identified temperature and the required cooling rate;
- computing one or more specifications of the second material based on the identified temperature and the required cooling rate; and
- causing the second 3D printing nozzle to print the second material onto the first material at the predicted time in accordance with the computed one or more specifications.

2. The computer-based method of claim 1, further comprising:
- determining whether the second material is achieving the required cooling rate; and
- based on determining the second material is not achieving the required cooling rate, iterating, until the second material is determined to be achieving the required cooling rate:
  - computing one or more updated specifications of the second material based on feedback from a thermal model simulation that simulates the cooling rate of the first material with the second material applied;
  - causing the second 3D printing nozzle to print the second material onto the first material in accordance with the computed one or more updated specifications; and
- removing the second material from the first material.

3. The computer-based method of claim 2, further comprising:
- based on determining the second material is achieving the required cooling rate:

continuing to print, by the second 3D printing nozzle, the second material onto the first material at the predicted time in accordance with the computed one or more specifications;

and removing the second material from the first material.

4. The computer-based method of claim 3, wherein removing the second material from the first material further comprises:

deploying one or more robotic devices to remove the second material from one or more sections of the first material; and causing the one or more robotic devices to apply the removed second material to one or more different sections of the first material.

5. The computer-based method of claim 1, wherein computing the one or more specifications of the second material further comprises:

identifying one or more defect zones in the first material; and computing at least one specification of the one or more specifications of the second material for the one or more defect zones.

6. The computer-based method of claim 1, wherein the computed one or more specifications include a thickness of the second material and a type of the second material.

7. The computer-based method of claim 1, wherein the first 3D printing nozzle and the second 3D printing nozzle print the first material and the second material, respectively, simultaneously, wherein the second material is comprised of an insulation material.

8. A computer system, the computer system comprising:

one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:

receiving real-time and historical data from one or more sources in a 3D printing environment;

identifying a temperature and a cooling rate of a first material of a 3D printed object printed by a first 3D printing nozzle based on the real-time and the historical data;

identifying one or more required properties of one or more microstructures of the 3D printed object based on an application of the 3D printed object;

computing a required cooling rate of the first material to achieve the required one or more properties;

predicting a time at which to apply a second material onto the first material using a second 3D printing nozzle based on the identified temperature and the required cooling rate;

computing one or more specifications of the second material based on the identified temperature and the required cooling rate; and causing the second 3D printing nozzle to print the second material onto the first material at the predicted time in accordance with the computed one or more specifications.

9. The computer system of claim 8, the method further comprising:

determining whether the second material is achieving the required cooling rate; and based on determining the second material is not achieving the required cooling rate, iterating, until the second material is determined to be achieving the required cooling rate:

computing one or more updated specifications of the second material based on feedback from a thermal model simulation that simulates the cooling rate of the first material with the second material applied;

causing the second 3D printing nozzle to print the second material onto the first material in accordance with the computed one or more updated specifications;

and removing the second material from the first material.

10. The computer system of claim 9, the method further comprising:

based on determining the second material is achieving the required cooling rate:

continuing to print, by the second 3D printing nozzle, the second material onto the first material at the predicted time in accordance with the computed one or more specifications;

and removing the second material from the first material.

11. The computer system of claim 10, wherein removing the second material from the first material further comprises:

deploying one or more robotic devices to remove the second material from one or more sections of the first material; and causing the one or more robotic devices to apply the removed second material to one or more different sections of the first material.

12. The computer system of claim 8, wherein computing the one or more specifications of the second material further comprises:

identifying one or more defect zones in the first material; and computing at least one specification of the one or more specifications of the second material for the one or more defect zones.

13. The computer system of claim 8, wherein the computed one or more specifications include a thickness of the second material and a type of the second material.

14. The computer system of claim 8, wherein the first 3D printing nozzle and the second 3D printing nozzle print the first material and the second material, respectively, simultaneously, wherein the second material is comprised of an insulation material.

15. A computer program product, the computer program product comprising:

one or more computer-readable tangible storage medium and program instructions stored on at least one of the one or more computer-readable tangible storage medium, the program instructions executable by a processor capable of performing a method, the method comprising:

receiving real-time and historical data from one or more sources in a 3D printing environment;

identifying a temperature and a cooling rate of a first material of a 3D printed object printed by a first 3D printing nozzle based on the real-time and the historical data;

identifying one or more required properties of one or more microstructures of the 3D printed object based on an application of the 3D printed object;

computing a required cooling rate of the first material to achieve the required one or more properties;

predicting a time at which to apply a second material onto the first material using a second 3D printing nozzle based on the identified temperature and the required cooling rate;

computing one or more specifications of the second material based on the identified temperature and the required cooling rate; and causing the second 3D printing nozzle to print the second material onto the first material at the predicted time in accordance with the computed one or more specifications.

16. The computer program product of claim 15, the method further comprising:

determining whether the second material is achieving the required cooling rate; and based on determining the second material is not achieving the required cooling rate, iterating, until the second material is determined to be achieving the required cooling rate:

computing one or more updated specifications of the second material based on feedback from a thermal model simulation that simulates the cooling rate of the first material with the second material applied;

causing the second 3D printing nozzle to print the second material onto the first material in accordance with the computed one or more updated specifications;

and removing the second material from the first material.

17. The computer program product of claim 16, the method further comprising:

based on determining the second material is achieving the required cooling rate:

continuing to print, by the second 3D printing nozzle, the second material onto the first material at the predicted time in accordance with the computed one or more specifications;

and removing the second material from the first material.

18. The computer program product of claim 17, wherein removing the second material from the first material further comprises:

deploying one or more robotic devices to remove the second material from one or more sections of the first material; and causing the one or more robotic devices to apply the removed second material to one or more different sections of the first material.

19. The computer program product of claim 15, wherein computing the one or more specifications of the second material further comprises:

identifying one or more defect zones in the first material; and computing at least one specification of the one or more specifications of the second material for the one or more defect zones.

20. The computer program product of claim 15, wherein the computed one or more specifications include a thickness of the second material and a type of the second material.

* * * * *